Patented Oct. 16, 1951

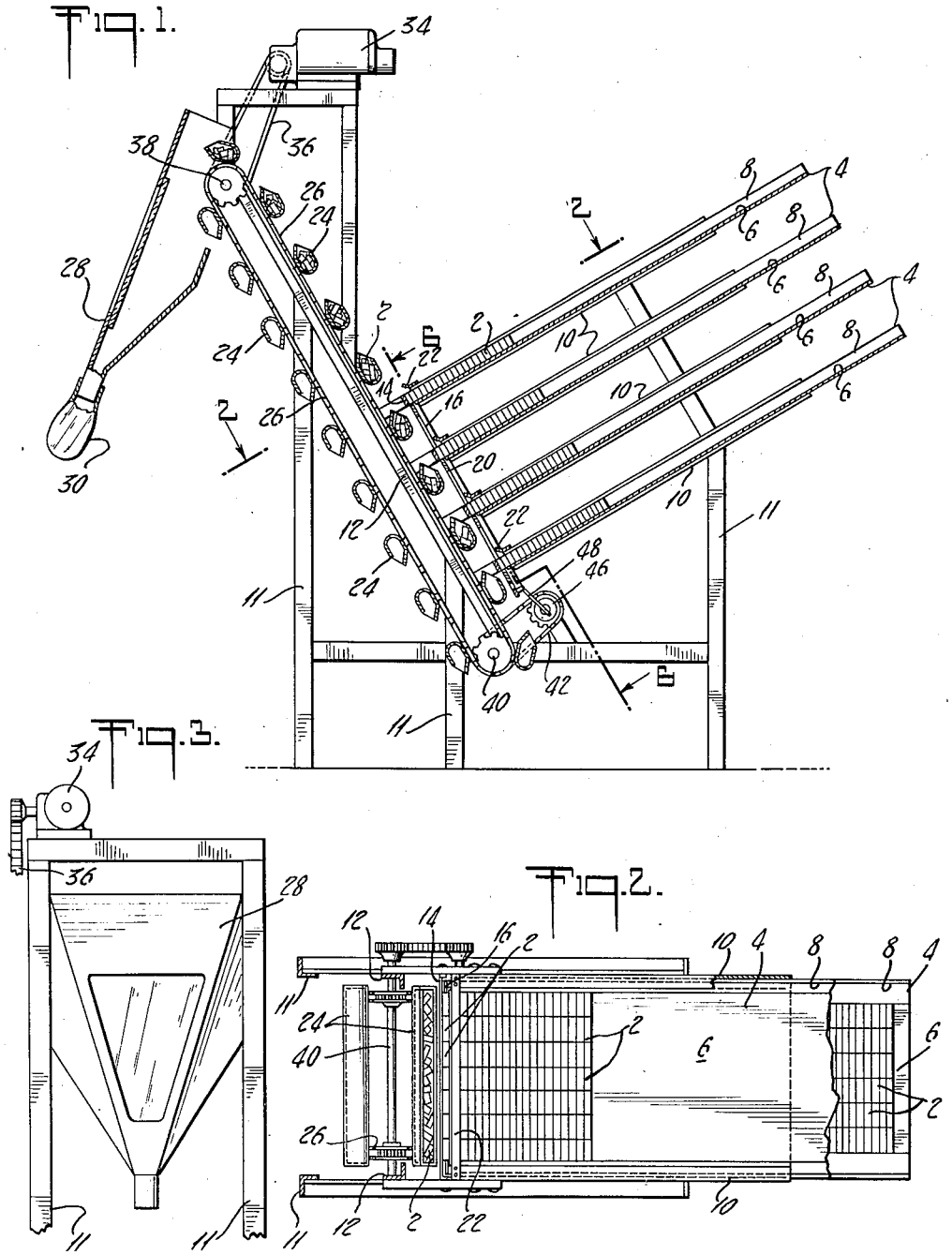

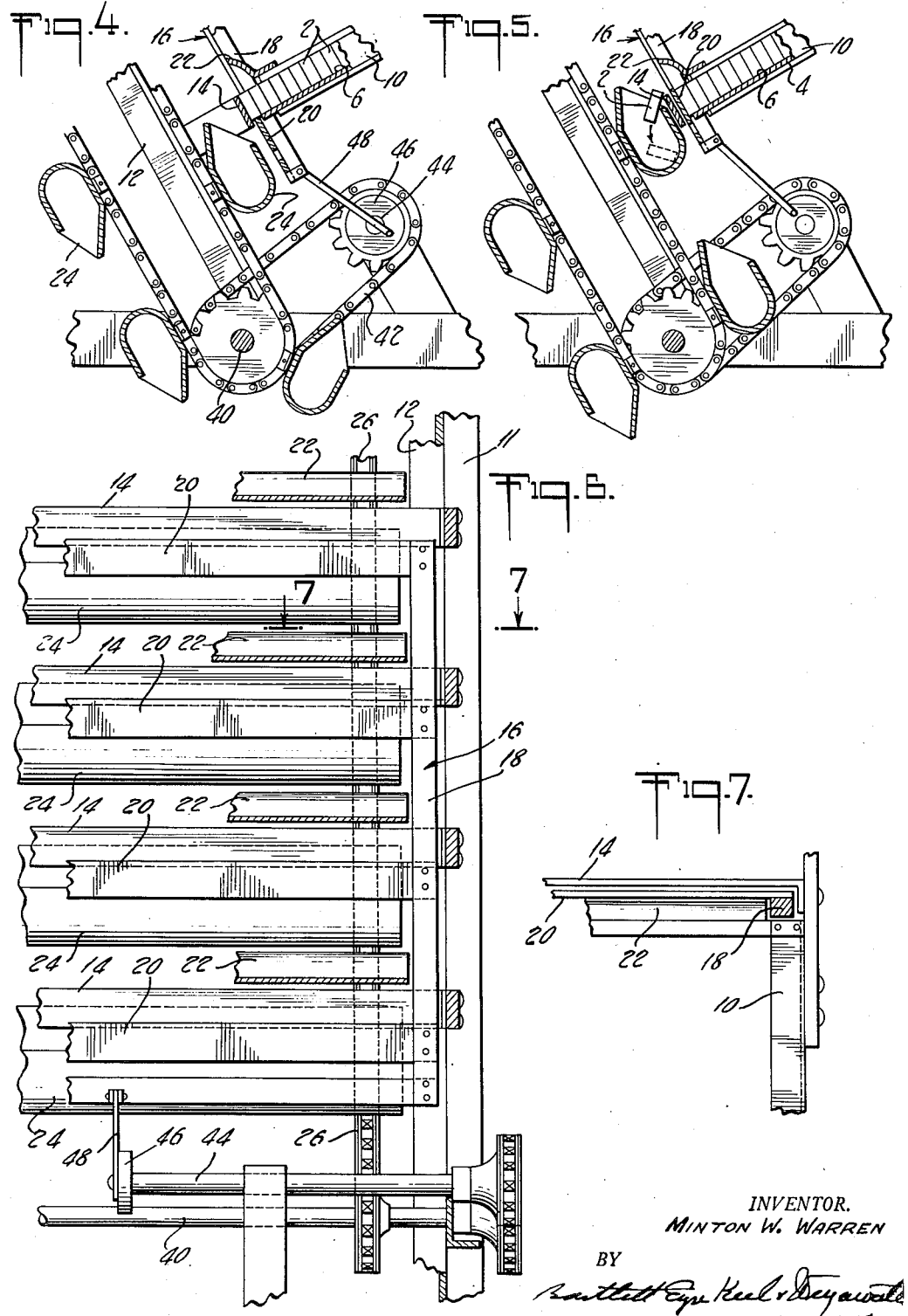

2,571,977

UNITED STATES PATENT OFFICE 2,571,977

ARTICLE ASSORTING MACHINE

Minton W. Warren, Canajoharie, N. Y., assignor to Beech-Nut Packing Company, Canajoharie, N. Y., a corporation of New York Application February 21, 1950, Serial No. 145,537

2 Claims. (Cl. 198—26)

One cent packages of candy-coated chewing gum are commonly put up in cellophane bags with twenty-five packages to a bag. The packages in each bag may contain gum of different flavors, for example, seven of the packages may contain pepsin gum, twelve peppermint and six spearmint.

One of the objects of the present invention is to provide a novel and improved machine for use in sorting packages of candy-coated gum in units and placing them in bags in the manner described.

Another of the objects of the invention is to provide a novel and improved assorting machine of the character indicated.

The several features of the invention, whereby these and other objects may be attained, will be readily understood from the following description and accompanying drawings, in which:

Figure 1 is a longitudinal sectional elevation, partly diagrammatical, of an assorting machine embodying the features of the invention in their preferred form;

Fig. 2 is a sectional plan view taken on the line 2—2 of Fig. 1;

Fig. 3 is a front view of a portion of the machine;

Fig. 4 is a detail sectional elevation on an enlarged scale taken substantially on the line 4—4 of Fig. 2;

Fig. 5 is a similar view with certain parts shown in a different position;

Fig. 6 is a sectional view, partly in elevation and on an enlarged scale, taken on the line 6—6 of Fig. 1; and Fig. 7 is a fragmentary sectional view taken on the line 7—7 of Fig. 6.

The machine illustrated in the drawings is particularly adapted for sorting one cent packages 2 of candy-coated gum, the packages consisting of small rectangular cardboard boxes or cartons containing the gum.

The packages are supplied to the machine in trays 4 each of which is provided with a bottom wall 6 and side walls 8, the front ends of the trays being left open. The packages are positioned in the trays on edge and in rows arranged side by side as shown. In case four trays are employed as shown, one of the trays may contain seven rows of packages as in the case of the uppermost tray shown in Fig. 2, these packages containing pepsin flavored gum. The other three trays may each contain six rows of packages, the packages of two of these trays containing peppermint gum, and the packages of the other tray containing spearmint gum. Any number of trays, however, may be employed and the number of rows of packages in the trays may be varied as desired.

The trays 4 are adapted to be removably mounted in guides 10, the trays when in these guides being spaced one above the other and being inclined downwardly and forwardly at an angle of substantially 35 degrees. The guides 10 may consist of longitudinally extending channel irons for receiving the longitudinal edges of the trays, and these channel irons are supported by uprights 11 and bars 12 of the machine frame, the forward ends of the guides 10 being secured to the bars 12.

Spaced from the lower end of each of the trays 4 when they are positioned in the rack guides 10, is a stop bar or plate 14. The ends of the several stop plates 14 are secured to the bars 12. The stop plates are spaced from the lower ends of the trays 4 a distance corresponding to the width of each package.

Mounted to slide through the spaces between the stop plates 14 and the ends of the trays 4, is a pusher bar 16 which is made up of longitudinally extending bars 18 and transverse bars 20 having their ends secured to the bars 18.

The pusher bar is adapted to be reciprocated to cause the transverse bars 20 to respectively pass through the spaces between the stop plates 14 and the ends of the trays 4, and then to be retracted from said spaces. During such advancing movement of the pusher bar 16, the packages engage the stop plates 14 and are discharged upwardly therefrom. Thus their are seven packages discharged from the uppermost tray 4, and six from each of the other trays during each advancing movement of the pusher bar. Upon the retracting stroke of the pusher bar 16, the rows of packages slide downwardly by gravity in the trays so as to cause their lowermost packages to engage the stop plates 14, ready to be ejected during the next advancing movement of the pusher bar. In order to guide the packages as they are ejected from the trays, deflecting strips 22 extend over the upper sides of said spaces, the ends of these strips 22 being secured to the tops of the guide bars 10.

As the packages are thus ejected from the trays, they drop by gravity into buckets 24 that are carried by sprocket chains of an endless conveyor 26, the buckets being of sufficient length to receive the full number of packages that are ejected from each tray. The conveyor 26 is inclined upwardly and forwardly so as to cause the buckets carried by the upper stretch thereof to pass successively the lower ends of the trays in position to receive the packages ejected therefrom.

The buckets 24 successively receive the packages as they are ejected, first from the lowermost tray, and then successively from the other trays so that as each bucket passes the end of the uppermost tray it contains twenty-five packages.

As the buckets pass over the upper end of the conveyor they discharge their packages in separate units into a bag packing chute 28 which directs them into separate cellophane bags, such as the bag 30, or the units may be delivered to a bag filling machine.

The conveyor 26 may be driven from an electric motor 34 through a sprocket chain 36 which passes over a sprocket wheel on a shaft 38 that carries the upper sprockets of the chain conveyor 26. The lower sprockets of the conveyor chain drive a shaft 40, which through a chain 42 and sprocket wheels drives a shaft 44 that carries a crank 46. This crank 46 through a link 48 operates the reciprocating pusher bar 16.

It will be apparent that my improved machine as above described, is capable of operating at any desired speed to sort the packages in separate units, and to discharge the units separately through the chute 28 or to a bag filling machine. The rows of packages in the trays 4 may contain any desired number of packages, and when the trays are empty they may be quickly and easily replaced by substituting filled trays in the guides 10. While the machine is particularly adapted for use in assorting and bagging one cent packages of candy-coated chewing gum, it will be apparent that certain features thereof are also applicable to the sorting of other articles.

As will be evident to those skilled in the art, my invention permits various modifications without departing from the spirit thereof or the scope of the appended claims.

What I claim is:

1. In an assorting machine for articles of the class described, the combination of means for supporting article containing trays spaced one above the other and inclined downwardly and forwardly, each tray having its lower end open and being provided with a bottom wall, and the articles being positioned on the bottom wall in a plurality of rows arranged side by side with the articles arranged one behind the other in each row, and the inclination of each tray being such as to tend to cause the articles to slide downwardly by gravity, a stop plate spaced below the lower end of each bottom wall a distance corresponding substantially to the width of an article so as to provide a stop for the rows of articles in the tray, a pusher bar adapted to be reciprocated transversely through said spaces between the lower ends of the bottom walls of the trays and said stop plates whereby during the movement of the pusher bar in one direction the lowermost articles of all of the trays are simultaneously ejected from the stop plates, and during the movement of the pusher bar in the opposite direction the next succeeding articles in the trays are deposited on the stop plates, an endless conveyor inclined upwardly and forwardly, buckets carried by the conveyor and spaced apart whereby during the travel of the conveyor the buckets successively pass by the lower ends of the trays and as the articles are ejected from the trays they drop into said buckets, each bucket successively receiving articles from the several trays from the lowermost to the uppermost tray, and means for thus driving the conveyor and operating said pusher bar.

2. In an assorting machine for articles of the class described, the combination of means for supporting article-containing trays spaced one above the other, each tray having its forward end open and being provided with a bottom wall, the articles being positioned on the bottom wall in a plurality of rows arranged side by side with the articles arranged one behind the other in each row, the rows of articles being adapted to slide forwardly over the bottom walls of the trays, a stop plate spaced from the forward end of each bottom wall a distance corresponding substantially to the width of an article so as to provide a stop for the rows of articles in the trays, a pusher bar adapted to be reciprocated transversely through said spaces between the forward ends of the bottom walls of the trays and said stop plates whereby during the movement of the pusher bar in one direction the foremost articles of all of the trays are simultaneously ejected from the stop plates and during the movement of the pusher bar in the opposite direction the next succeeding articles in the trays are deposited on the stop plates during the forward sliding movement of the rows of articles, an endless conveyor, buckets carried by the conveyor and spaced apart whereby during the travel of the conveyor the buckets successively pass by the forward ends of the trays and as the articles are ejected from the trays they are deposited into said buckets, each bucket successively receiving articles from the trays from the lowermost to the uppermost tray, and means for thus driving the conveyor and operating said pusher bar.

MINTON W. WARREN.

REFERENCES CITED

The following references are of record in the file of this patent:

UNITED STATES PATENTS

| Number | Name | Date |
|---|---|---|
| 746,247 | Baggaley | Dec. 8, 1903 |
| 1,818,475 | Gray | Aug. 11, 1931 |
| 2,109,301 | Makane | Feb. 22, 1938 |
| 2,415,941 | Edson | Feb. 18, 1947 |